MACHINE FOR COMPOSING IDEOGRAPHS

Filed June 2, 1964 5 Sheets-Sheet 1

Inventors:
FRED F. SHASHOUA,
HAROLD E. HAYNES &
WARREN R. ISOM

BY

[signature]

Attorney

Inventors:
Fred E. Shashoua,
Harold E. Haynes &
Warren R. Isom
BY [signature]
Attorney

MACHINE FOR COMPOSING IDEOGRAPHS

Filed June 2, 1964

Inventors:
FRED E. SHASHOUA,
HAROLD E. HAYNES &
WARREN R. ISOM
BY
Attorney

MACHINE FOR COMPOSING IDEOGRAPHS

Filed June 2, 1964

Inventors:
FRED E. SHASHOUA,
HAROLD E. HAYNES &
WARREN R. ISOM
BY
Attorney

Inventors:
FRED E. SHASHOUA,
HAROLD E. HAYNES &
WARREN R. ISOM
BY [signature]
Attorney

United States Patent Office 3,325,786

Patented June 13, 1967

3,325,786

MACHINE FOR COMPOSING IDEOGRAPHS

Fred E. Shashoua, Cherry Hill, and Warren R. Isom and Harold E. Haynes, Haddonfield, N.J., assignors to Radio Corporation of America, a corporation of Delaware Filed June 2, 1964, Ser. No. 371,945
18 Claims. (Cl. 340—172.5)

ABSTRACT OF THE DISCLOSURE

A machine for composing characters such as Chinese ideographs from strokes supplied by a typewriter, paper tape or the like. The strokes are translated to binary coded signals and the latter are accumulated and compared with binary words stored in a memory. When a sufficient number of signals to identify a character have been accumulated, that character automatically is selected from (is illuminated on) an optical storage matrix. An optical system projects the illuminated character onto a pickup device such as a vidicon and the latter applies electrical signals indicative of the selected character to a display device such as a kinescope. The character appearing on the kinescope then may be recorded by photographing the same. Additional features of the system include the ability concurrently to display a group of ambiguous characters; the ability to insert new characters not stored in the optical storage matrix; and the ability temporarily to display a short character which forms part of a more complex character.

An early form of a machine for the composition of Chinese from a keyboard is discussed in an article, "The Sinotype—A Machine for the Composition of Chinese From a Keyboard," by S. H. Caldwell, Journal of the Franklin Institute, volume 267, No. 6, pages 471–502 (June 1959). While an advance in the state of the art, the Sinotype has a number of practical limitations, such as relatively slow speed, relatively limited vocabulary and the relatively complex electromechanical keyboard-to-character selection translation system employed. As an example of the latter, the load on some of the switches is so large that pneumatic controls at air pressures of 140 pounds per square inch are needed to move the sliding elements of the switches.

An object of the present invention is to provide a new and improved machine for composing characters, such as Chinese, Japanese or Korean ideographs.

Another object of the invention is to provide a photocomposing machine for ideographs, which has a relatively large vocabulary and is capable of operating at relatively high speeds.

Another object of the invention is to provide an improved photocomposing machine having such advantages as improved means for identifying ambiguous ideographs, character insertion circuits and other features discussed in detail below.

Studies have indicated that in any of the languages here under consideration, there are only a basic number of strokes (some twenty-one strokes in Chinese). But, there may be fairly wide variation in the dimensions and position of any basic stroke when it is part of an ideograph. Nevertheless, the same sequence of strokes is almost always used to produce a particular character (ideograph). This last feature is made use of both in the Sintoype and in the present machine.

In the machine of the invention, just as in the Sinotype, the input information, which may appear on different keys of the typewriter, includes single strokes, phrases made up of two or more strokes, and punctuation. Each time a key is depressed, the typewriter produces a binary code which represents the stroke, phrase, or the like, on the key. The binary information obtained as a result of the successive key depressions is accumulated.

In the Sinotype, the accumulated information is applied to a relay matrix and the output voltages thereby obtained are employed mechanically to position a matrix of characters in such manner that the desired character may be selected. In the present machine, on the contrary, electromechanical digital to matrix moving voltage conversion is not employed. Nor is there any movement of a matrix of characters.

According to the present invention, the binary information accumulated in response to successive key depressions is continuously compared with a large number of binary words stored in a memory. In the form of the invention discussed in detail below, the memory is a magnetic drum, but other memories may be employed. When an accumulated binary code is found to match a binary word stored in the memory, an address is automatically supplied. One part of the address identifies the location in an optical storage matrix of a group of characters and the other part of the address identifies the location of the desired character in the group of characters. The optical storage matrix and other elements associated with character selection remain stationary.

In response to the first portion of the address, the selected location in the optical storage matrix is illuminated and the image of a group of characters is applied to one end of an optical tunnel. The output of the optical tunnel is applied to the screen of an electron beam device, such as a vidicon. The second part of the address causes the beam of the vidicon to apply a scan raster to the desired character in the group of characters.

The character selected by the vidicon may be applied to a kinescope on which the character is displayed for examination by the keyboard operator. It may also be applied to a second kinescope whose output may be projected onto a film or the like. If the character is correct, the keyboard operator depresses a key which causes this film to be exposed. Each time the film is exposed, it is shifted to a new position. In this way, the film records the successive characters selected in successive positions on the film. The film may be used to make up the final copy, such as a newspaper, book, or the like.

The invention is discussed in greater detail below and is described in the following drawings, of which:

Figure 1:
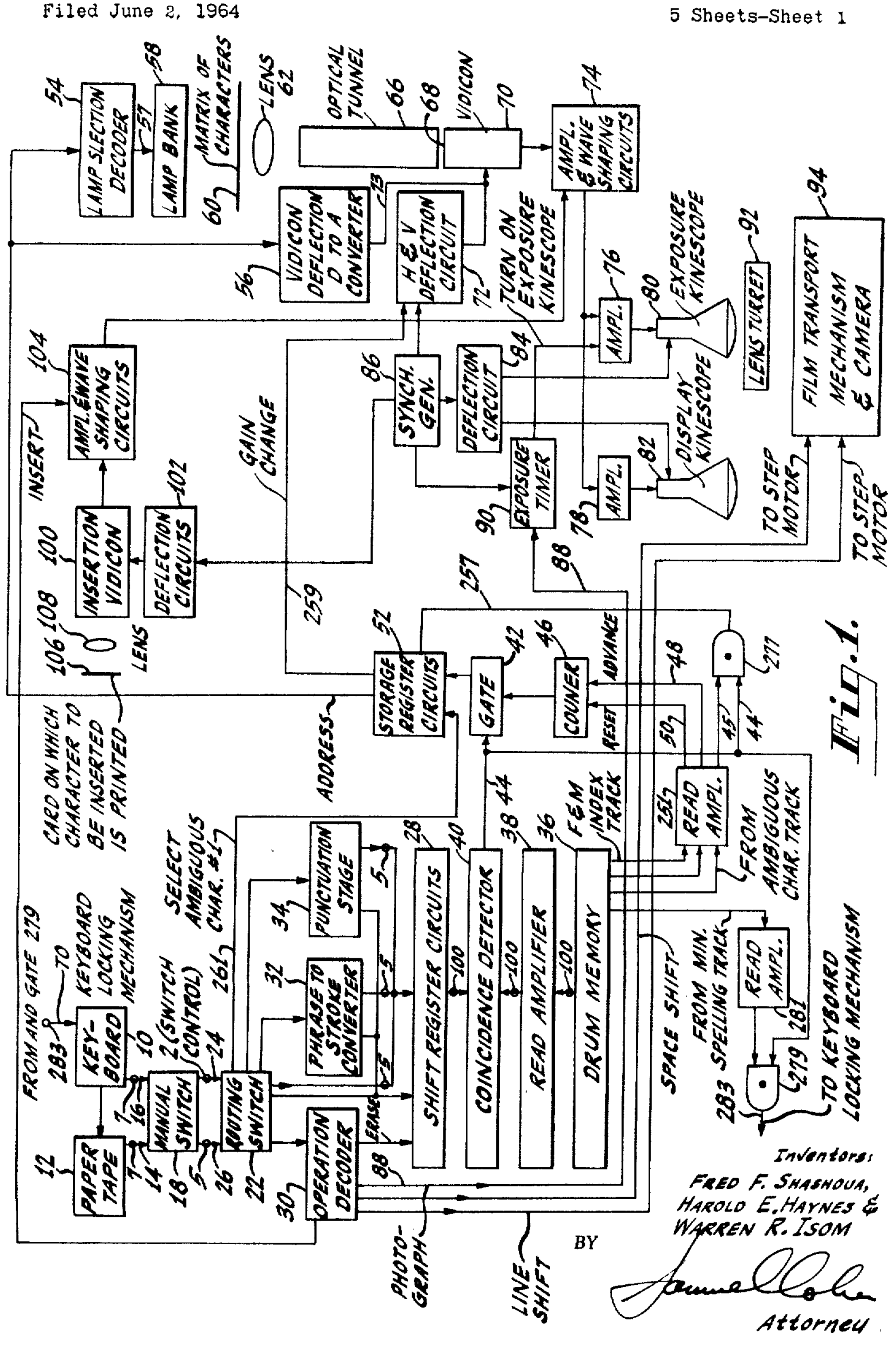
FIGURE 1 is a block circuit diagram of the system of the invention.

The machine shown in FIGURE 1 includes a keyboard 10 which is similar to the one described in detail in the article above. Twenty-one of the keys identify the twenty-one basic strokes making up the Chinese language. Twenty of the keys identify "phrases," defined here as groups of strokes, which correspond in some ways to groups of English characters such as "th," "ing," "and," "or," "ous," and so on, which are common to many different words. Each such phrase, termed an "entity" in the article, may be made up of two, three or more strokes. An example is the phrase identified by the letters DPB as shown on the top of page 477 of the article. This phrase and the others are common to many, many different ideographs. A number of the keys identify punctuation marks. A number of the keys identify operations, as, for example, "photograph," "erase," "insert" (a character which does not appear in the matrix of characters), and so on.

Each time a key on the keyboard is depressed, the keyboard produces a binary code consisting of seven digits. Two of the digits define the type of information, such as stroke, phrase or the like. Five of the digits represent the information. In practice, there may also be an eighth digit—a parity digit. However, to simplify the explanation, this parity digit and the parity check and other circuits associated with the parity digit, all of which are conventional, are omitted from the drawings and discussion.

A second possible input to the system is the paper tape 12. The paper tape may be produced in response to the output from the keyboard illustrated or from a similar keyboard. Its output, like that of the keyboard, is a seven-bit code.

It might be mentioned here that throughout the drawings, single leads may be employed to represent multiple conductors. In some cases, a numeral appears next to the single lead to identify the number of conductors in the bus. Thus, the number 7 next to the leads 14 and 16 indicates that there are seven leads in each of these busses.

The purpose of the manual switch 18 (shown separately but, in practice, part of the keyboard) is to permit connection either to the keyboard or to the paper tape. The output of this switch is applied to a routing switch 22 whose purpose is to sense the two-bit code carried on bus 24. In response to this code, the routing switch directs the five-bit code appearing on bus 26 to an appropriate circuit. Of the seven bits applied to the routing switch, the $2^6$ and $2^5$ bits make up the operation code, as shown in the following table:

| Type of Information on Key | $2^6$ bit | $2^5$ bit |
|---|---|---|
| Stroke | 0 | 0 |
| Operation | 1 | 1 |
| Phrase | 1 | 0 |
| Punctuation | 0 | 1 |

In response to the code 00, the routing switch applies the five-bit code directly to the first five stages at the input of the shift register 28. In response to the code 11, the routing switch causes the five-bit code to enter the operation decoder 30. In response to the code 10, the routing switch causes the five-bit code to be applied to the phrase-to-stroke converter 32. In response to the code 01, the routing switch causes the five-bit code to be applied to the punctuation encoder 34.

In addition to the five bits supplied, the routing switch also supplies a sixth bit, the function of which is discussed in more detail later. However, as one example, the sixth bit, when applied to the advance circuit of the shift register, functions to advance the information stored in each five stages of the shift register to the next five stages to the right.

The drum memory shown at 36 has 102 information storage tracks and two timing tracks, a total of 104 tracks. Each information track is capable of storing ten thousand bits. In other words, the drum can be considered to have ten thousand lines. Each line is capable of storing twenty, five-bit characters. The 101$^{st}$ track is a clock track which produces ten thousand output pulses each drum revolution. The 102$^{nd}$ track is an index track which produces one pulse per drum revolution. The 103$^{rd}$ track is for ambiguous character identification. The 104$^{th}$ track is for minimum spelling identification. These last two matters are discussed in more detail below.

The drum memory stores up to ten thousand binary words, each word identifying a Chinese ideograph. Its output is applied through the read amplifiers 38 to the coincidence detector 40. The coincidence detector also receives an input from the shift register 28. When the word stored in the shift register matches a word read from the drum memory, the coincidence detector applied a priming signal to gate 42 via lead 44.

The clock pulses produced in the drum memory are applied to the counter 46 through read amplifier 251 and lead 48. The counter is reset once each drum revolution by the index pulse applied by lead 50. The count on the counter identifies the line in the memory which is compared with the word stored in the shift register. Accordingly, it may be considered a drum address. As will be discussed shortly, this count is also the address in the storage matrix of the Chinese character corresponding to the one stored in the drum memory.

As already discussed, when a word in the shift register matches a word in the drum memory 36, the coincidence detector 40 primes the gate 42. When this gate is primed, the count recorded in counter 46 passes through gate 42 to storage register circuits 52. The storage register is connected to a lamp selection decoder 54 and a vidicon deflection digital-to-analog converter 56. The lamp selection decoder 54 decodes a portion of the address word from the storage register 52 and produces outputs on leads 57 which illuminate a particular lamp in the lamp bank 58. This lamp is located behind one group of characters stored in the optical storage matrix 60.

It might be mentioned here that in a high capacity machine, there may be three lamp banks and three storage matrices. Each matrix stores somewhat over thirty-three hundred characters to provide a total storage capacity for the three matrices of some ten thousand characters. A detailed discussion of this portion of the system appears in application Ser. No. 297,642, now abandoned, filed July 25, 1963, by W. E. Leavender and assigned to the same assignee as the present application. In the present application, only one lamp bank and one storage matrix are shown to keep the explanation simple.

Returning to FIGURE 1, the lamp energized in lamp bank 58 illuminates one group of characters (actually sixteen characters) in the storage matrix 60. A lens system, illustrated schematically at 62, projects or otherwise applies the illuminated portion of the matrix (the selected group of characters) onto the screen 68 of the vidicon 70 via the optical tunnel 66. In practice, the face of the vidicon is physically located right next to the output end of the tunnel. A more detailed discussion of the tunnel appears in the copending application above and the references cited therein.

In the present machine, there are sixteen characters in the group projected onto the vidicon and the vidicon must select one of these characters. The horizontal and vertical deflection circuits 72 cause the electron beam of the vidicon to scan through a small raster which is normally the size of one character. However, as is discussed in more detail later in connection with the selection of an ambiguous character, under special circumstances the raster is expanded to the size of a block of four characters. The digital-to-analog converter 56 converts the binary word it receives into analog voltages whose amplitudes depend upon the value of the binary word. These voltages are applied to the horizontal and vertical deflection yokes via lead 73 and cause the raster produced by circuits 72 to scan the area of the vidicon screen containing the desired character. Put another way, the digital-to-analog converter 56 converts the binary word it receives to the X and Y bias or centering voltages whose respective values determine where on the vidicon screen the raster will start. Circuits of the type identified by blocks 56 and 72 are discussed in copending application Ser. No. 200,365, now Patent No. 3,274,550 filed June 6, 1962, by S. Klein and assigned to the same assignee as the present application.

The electrical signals produced by the vidicon 70 are applied to amplification and wave-shaping circuits 74. The latter apply these signals to the video amplifiers 76 and 78. The amplifiers apply the signals from stage 74 to the control grids of the display and exposure kinescopes 82 and 80. The exposure kinescope 80 is normally cut off because its cathode is insufficiently negative with respect to its control grid. However, when the "photograph" key on the keyboard (not shown) is depressed, the cathode of the exposure kinescope is driven negative and an image appears on its screen. This action can be considered analogous to that of opening the shutter of a camera to expose the film therein. In practtice, the kinescope bias is changed, as described, by a transistor switch which, when actuated by the "turn on exposure kinescope" signal from stage 90, shorts out a resistor in a voltage divider to drive the kinescope 80 cathode more negative.

Both kinescopes 80 and 82 also receive horizontal and vertical deflection voltages from deflection circuits 84. The latter are driven by a synchronization generator 86 which may include a stable oscillator. The purpose of the generator 86 is to synchronize the horizontal and vertical deflection voltages applied to the various kinescopes and the vidicon.

The display kinescope is visible to the keyboard operator. The image produced on its screen is that of the character selected by the vidicon. If the character is correct, the keyboard operator depresses a "photograph" key. The code thereby produced is routed to the operation decoder 30 which produces an energizing signal on lead 88. The exposure timer 90 is actuated by this energizing signal and it enables the normally cut-off kinescope 80 for a predetermined time interval.

When enabled, the exposure kinescope produces on its screen the same image as displayed on the display kinescope One of the lenses in the lens turret 92 projects this image onto the film in the camera within block 94. Upon completion of the exposure, a space shift signal is provided by the operation decoder 30 and this is applied to a step motor in the film transport mechanism within block 94. The function of the step motor is to move the film a sufficient distance so that the next character to be printed will be properly spaced from the character just printed.

The lens turret 92 and the film transport mechanism 94 are, in themselves, known and commercially available.

There is a microswitch (not shown) positioned in the path of the film mechanism. Its purpose is to detetrmine when the end of a line has occurred. When the film is exposed with a certain number of characters, the motion of the film magazine near the end of its travel trips the microswitch, and the latter actuates the mechanism which returns the film magazine to its initial position, that is, a position such that the next character will occur at the start of the line. The microswitch also actuates the circuit which advances the film to a position at which the next exposure can be made.

Depression of the "line shift" key of the keyboard closes a circuit in shunt with the microswitch contacts to effect the same operation as if the microswitch were actuated.

In the present system, electrical solenoids are employed for horizontal motion and film advance. The solenoids engage a toothed gear and cause the advance. These means are well-known and are commercially available.

It is possible in the present system to change from composition which reads from the top to the bottom of columns to composition which reads from left to right in rows. This is accomplished by switching the deflection leads on the exposure kinescope to electrically rotate the image on the screen.

The various means described in the preceding three paragraphs are different from those employed in the Sinotype. However, it should be understood that the Sinotype mechanisms may be used instead. There, a step motor in the film transport mechanism is actuated by a signal from the operation decoder. The function of this motor is to position the film so that the next character to be printed will be the first one on the next line. It is also possible to use the dove prism composition format changing mechanism of the Sinotype instead of the electronic rotation means discussed above.

Even though there are ten thousand characters available in the system of FIGURE 1, it is sometimes necessary, in printing Chinese, to use additional characters which represent common names, scientific terms in other languages, and so on. The machine of FIGURE 1 includes provision for inserting such characters. This portion of the system comprises the insertion vidicon 100, the deflection circuits 102 for the vidicon, and the amplifying and wave-shaping circuits 104.

When it is desired to insert a character, a card 106, on which the character to be inserted is printed, is placed in front of the lens 108. The "insert" character key on the keyboard is depressed. The insertion vidicon 100 thereupon scans the character and the output of the vidicon is applied by amplifier and wave-shaping circuits 104 to circuits 74. The latter apply the signals to the amplifiers 76 and 78, and the inserted character appears on the display kinescope 82.

The lens 108 may be a zoom type lens and this makes it possible for the operator to adjust the size of the character as it appears on the display kinescope. When the operator is satisfied, he depresses the photograph switch on the keyboard, whereupon the exposure timer 90 is actuated and it, in turn, causes the inserted character to appear on the exposure kinescope 80.

Following is a more detailed discussion of some of the circuits shown in FIGURE 1. In a number of cases, conventional components and engineering details not essential to an understanding of the invention are omitted.

*Stroke to binary character conversion system*

When a stroke is typed on the keyboard, a seven-bit code is applied from the manual switch to the routing switch. The $2^5$ and $2^6$ bits may be applied to a NOR gate 120 shown in FIGURE 2. (In practice, a register (not shown) may be employed in front of the gate 120 temporarily to store the two-bit code. In this case, there may be an inhibit third input to the NOR gate, which is removed only in response to the depression of a key identifying an operation.) The remaining five bits, that is the $2^4$ through $2^0$ bits, are applied to a group of AND gates 122 through a resistor 121. From the table discussed previously, it can be seen that the $2^6$ and $2^5$ bits are both 0 whenever a stroke is typed. The NOR gate 120 produces a 1 output in response to this 00 code and a 0 output in response to all other inputs.

The 1 output, when present, is applied to a circuit which actuates the advance terminal of shift register 28. This circuit and other functions performed by this circuit are discussed in more detail later in connection with the shift register. This causes the information stored in each five stages of the shift register to be shifted to the next five stages to the right. The 1 output of NOR gate 120 is also applied to the gates 122. This signal serves a priming signal for gates 122 and the input five-bit character passes through the gates to the first five stages at the input to the shift register. As is discussed shortly, these first five stages comprise a temporary storage register. These five stages are at this time in a reset condition and therefore are available for temporary storage. This, too, is discussed shortly.

Punctuation stage

The punctuation stage, for purposes of the present explanation, may be considered to be similar to the stroke to binary conversion system just discussed and is therefore not illustrated separately. This stage includes a two-input gate, similar to the gate 128 of FIGURE 3, which responds to the code 01 for the $2^6$ and $2^5$ bits, respectively, and a group of AND gates, such as 122 of FIGURE 2, which are primed by this gate. The output of the gates may be applied to the shift register, just as in the case of gates 122 of FIGURE 2. And the output of the two-input gate may be used to advance the shift register, again as in the circuit of FIGURE 2.

Phrase-to-stroke converter circuit

Figure 3:
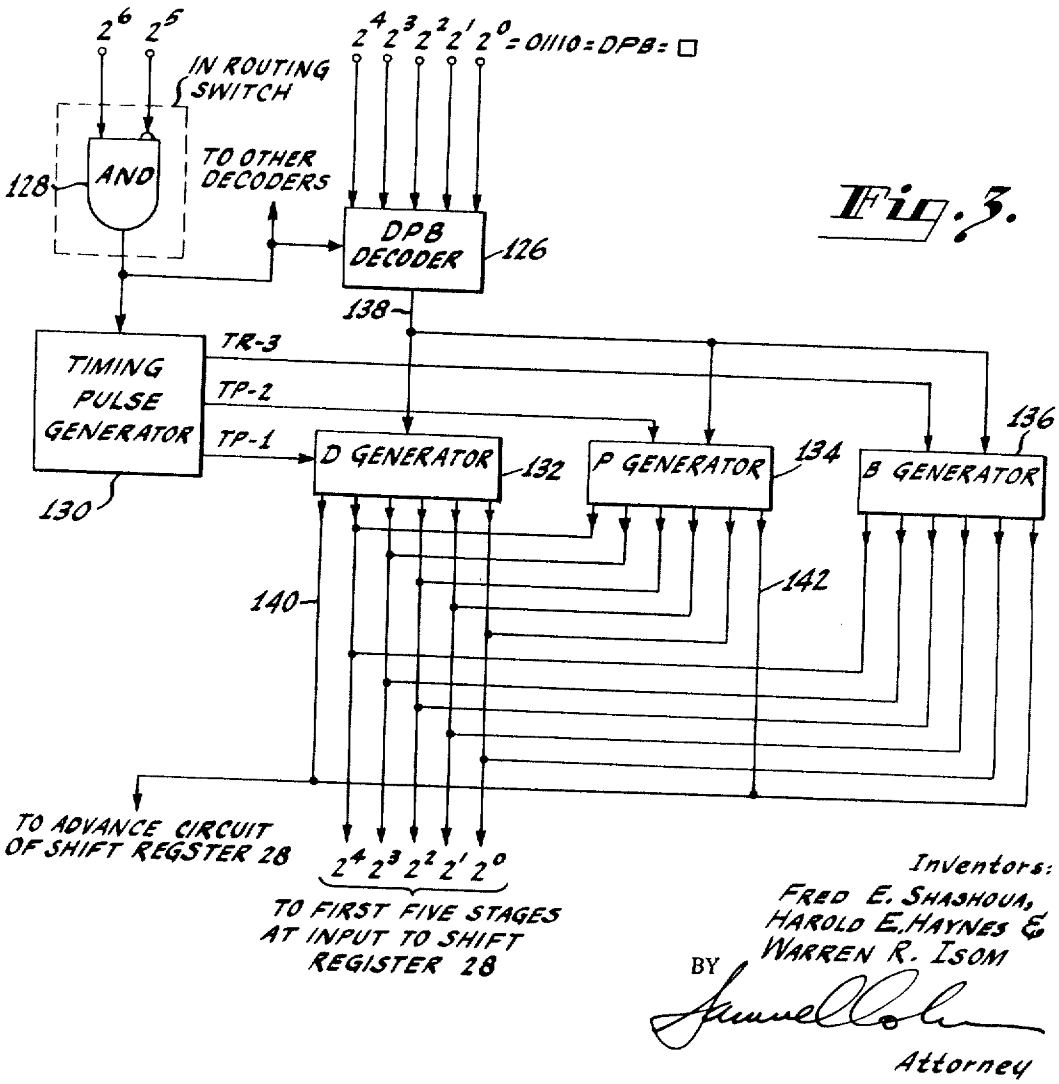
FIGURE 3 is a block circuit diagram of a portion of the circuit for translating phrase information into stored binary information.

FIGURE 3 illustrates a number of the circuits within phrase-to-stroke converter block 32 of FIGURE 1. There are some twenty phrases available on the keyboard. Therefore, there are twenty decoders in the phrase-to-stroke converters 32, only one of which, 126, is shown in FIGURE 3. The others operate in a similar manner.

Figure 2:
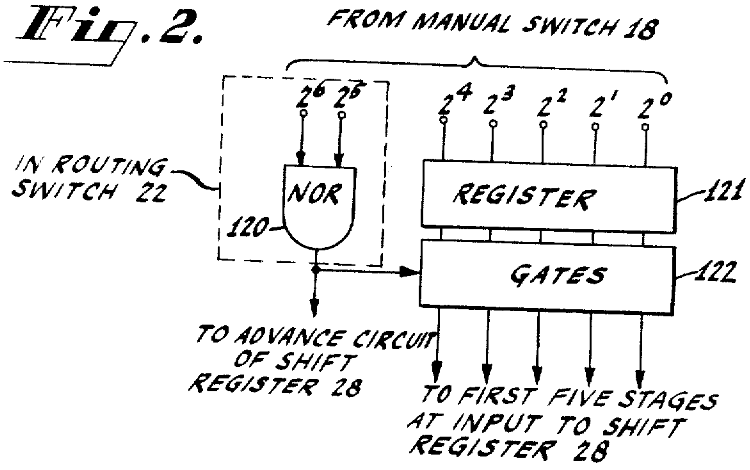
FIGURE 2 is a block circuit diagram of a portion of the circuit for translating stroke information into stored binary information.

The $2^4$–$2^0$ bits from the routing switch may be applied to the register 121 of FIGURE 2 and from the register to the decoder. The $2^5$ and $2^6$ bits are applied to AND gate 128, the $2^5$ bit being applied to the inhibit terminal of the AND gate. (As in the case of FIGURE 2, these bits may be stored temporarily in a register between the keyboard and gate 128.) Accordingly, when the $2^6$ and $2^5$ bits, respectively, represent the code 10, indicating that the key depresed is a phrase key, AND gate 128 is enabled and produces a 1 output. This 1 output is applied to a timing pulse generator 130 and also to decoder 126.

The timing pulse generator produces a series of output pulses. Three output leads are shown and these carry the pulses TP–1, TP–2 and TP–3, respectively. The timing pulses are applied to different binary code generators, three of which, 132, 134 and 136, are shown.

In the operation of the circuit of FIGURE 3, assume that the decoder 126 is one for decoding the phrase 01110 which represents the Chinese phrase DPB. When the key representing this phrase is depressed, the 1, 0 produced on the leads $2^6$, $2^5$ enables AND gate 128 and the AND gate output primes decoder 126. The remaining inputs therefore cause the decoder to produce an output on lead 138. This output is applied to the D generator 132, the P generator 134 and the B generator 136, priming the respective generators. The 1 output of the AND gate also actuates the timing pulse generator 130 which thereupon produces the three timing pulses TP–1, TP–2 and TP–3, in that order.

The first timing pulse TP–1 enables the D generator and it concurrently produces an advance pulse on its output lead 140 and the five-bit code 01000 on its five remaining output leads. The advance pulse on lead 140 causes the advance circuit in the shift register to shift the words stored in each five stages of the shift register 28 (FIGURE 1) to the next five stages to the right and the character 01000, which represents the stroke D, to be applied to the first five stages of the shift register.

The next timing pulse TP–2 enables the P generator 134. This causes an advance pulse to appear on lead 142 and the code 00001, which represents the stroke P, to appear on the five remaining leads. As in the previous example, the advance pulse causes the information in the storage register to be shifted to the next five stages to the right, and the five-bit character to be entered into the first five stages of the shift register.

The timing pulse TP–3, which is applied to the B generator, also causes a similar chain of events. First, the information in the storage register is shifted five places to the right and then the code 10000, which represents the stroke B, is applied to the first five stages of the register.

In the circuits above, any one of a number of circuits may be used to produce the pulse applied to the advance circuit in the shift register. For example, since a five-bit stroke code always contains at least one bit of value 1, an OR gate connected to receive the five bits, may serve as a convenient advance pulse generator. Each circuit, such as 132, 134 and so on, may include such a generator.

Summarizing the phrase-to-stroke conversion discussed above, when a key identifying a phrase is depressed, the phrase-to-stroke converter 32 in FIGURE 1 produces a number of five-bit characters, each identifying a stroke. These characters are applied in sequence to the shift register, the register being advanced each time a character is applied.

Shift register and associated circuits

Figure 4:
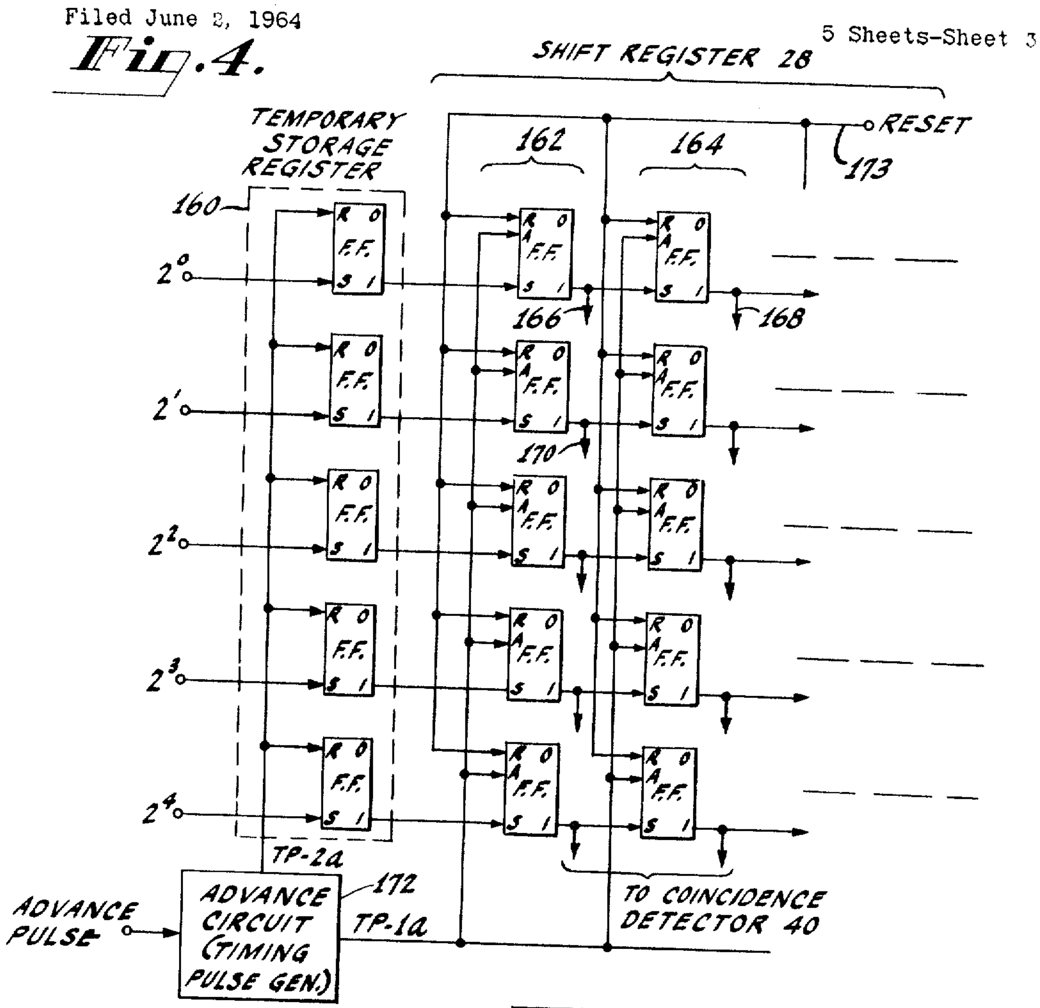
FIGURE 4 is a block circuit diagram of the shift register circuits.

A portion of the shift register 28 of FIGURE 1 and circuits associated therewith are shown in FIGURE 4. The input circuit to the shift register includes a five-stage temporary storage register 160. The $2^0$–$2^4$ bits from any one of the preceding stages 22, 32 or 34 (FIGURE 1) are applied in parallel to the set (S) terminals of the flip-flops making up this register.

The register 160 is connected in parallel to the first five stages 162 of the shift register 28. These five stages, in turn, are connected in parallel to the next five stages 164 of the shift register, and so on. The outputs of the various stages in the shift register, which appear on leads such as 166, 168, 170, and so on, are applied to the coincidence detector 40 of FIGURE 1.

The advance pulse from stages such as 22, 32 or 34 is applied to the advance circuit 172. This circuit is a timing pulse generator which produces, in sequence, timing pulses TP–1*a* and TP–2*a*. The leads at which these pulses occur are so legended. The first timing pulse TP–1*a* occurs slightly after the time at which the five-bit word is applied to the temporary storage register 160.

In the operation of the circuit of FIGURE 4, a five-bit character and an advance pulse are concurrently applied to the temporary storage register 160 and to the advance circuit 172, respectively. Shortly thereafter, the advance circuit produces the first timing pulse **TP–1*a*. It is concurrently applied to the advance (A) terminals of all of the stages of the shift register. The effect of this advance pulse is to shift the information in the shift register to the next five stages to the right. For example, the information present in the five stages 162 is applied in parallel to the stages 164. The information present in the five stages 164** is applied in parallel to the third bank of five stages (not shown) in the shift register, and so on.

As soon as the information is shifted out of the first five stages 162 of the shift register, the five bits just applied to the temporary storage register 160 flow into the first five stages 162. Shortly thereafter, the timing pulse **TP–2*a* occurs which is applied to the reset (R) terminals of the temporary storage register 160. This places the temporary storage register in a reset condition ready to receive the next character from any one of the preceding stages 22, 32 or 34** of FIGURE 1.

The showing of FIGURE 4 is largely schematic, since the various circuits are, in themselves, very well known and are similar to those in the RCA 301 computer. Leads not essential to an understanding of the circuit have been omitted. For example, in practice, the 0 output terminals of the various stages are connected to the reset terminals of the following stages and so on. The advance circuit, too, is well known and may include so-called "one-shot" multivibrators connected to one another for generating pulses of the correct duration in the desired sequence.

Character selection

Figure 5:
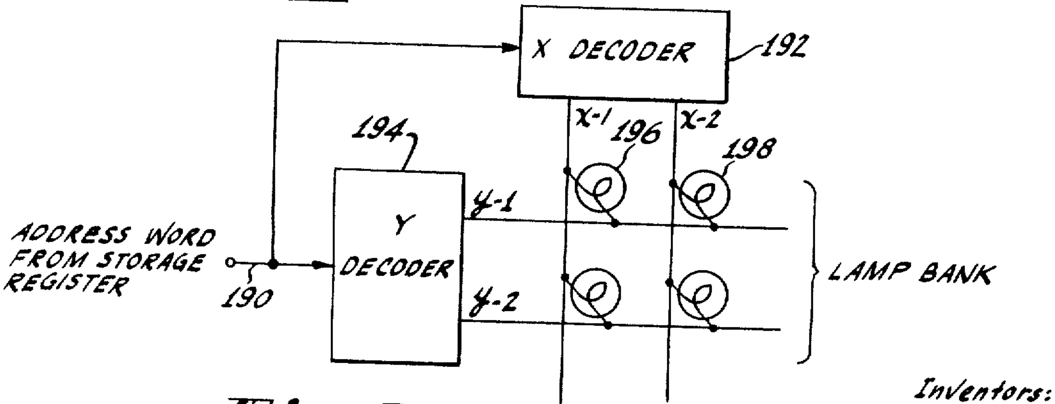
FIGURE 5 is a block and schematic diagram of a portion of the lamp bank and the decoders associated therewith.

FIGURE 5 shows in a schematic way a portion of the character selection system. One portion of the address word from the storage register 52 of FIGURE 1 is applied by a bus 190 to the $x$ and $y$ decoders 192 and 194, respectively. The $x$ decoder may be arranged to connect a voltage source to one of the $x$ leads of the lamp bank matrix, and the $y$ decoder may be arranged to connect one of the $y$ leads to a source of reference potential, such as ground. The matrix includes a plurality of lamps 196, 198, and so on, each lamp being connected between one $x$ lead and one $y$ lead.

In the operation of the decoder of FIGURE 5, the $x$ decoder may connect the voltage source to a lead, such as $x$–1, all other $x$ leads being maintained disconnected from the source. In a similar manner, the $y$ decoder may connect a source of reference potential, such as ground, to one of the $y$ leads, such as $y$–1, all other $y$ leads being maintained disconnected from ground. In this case, the lamp 196 connected to leads $x$–1 and $y$–1 will be illuminated and all other lamps will remain unilluminated.

Figure 6:
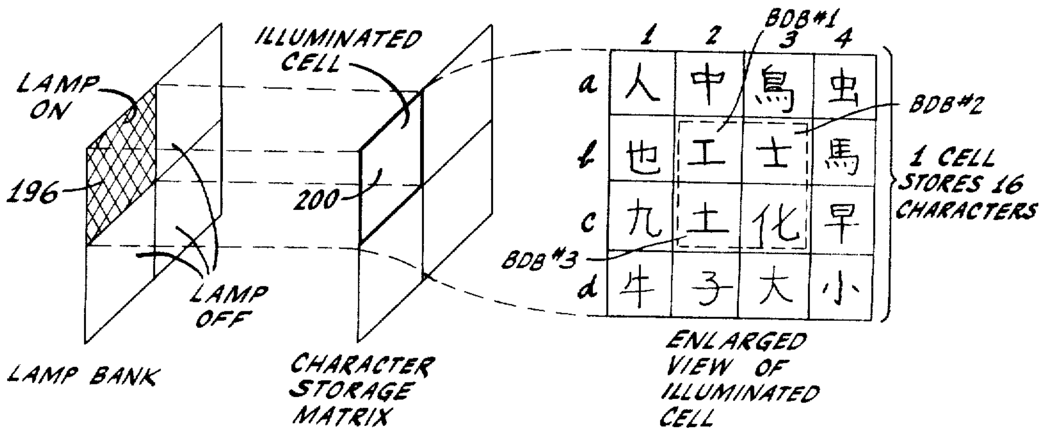
FIGURE 6 is a schematic diagram showing a portion of the light bank and a portion of the character storage matrix.

FIGURE 6 shows that the lamp bank is located behind the character storage matrix. The cross-hatched area 196 indicates that lamp 196 is on, all other lamps in the bank being off. This lamp bank illuminates the cell 200. An enlarged view of this cell, which appears to the right of FIGURE 6, indicates that the cell consists of sixteen Chinese characters or ideographs.

More details of the character selection system appear in the copending Lavender application mentioned above. As stated there, the image of the sixteen characters is projected by a system of half-silvered mirrors and lenses through an optical tunnel and onto the screen of an electron beam device, such as a vidicon, image orthicon, or the like. The remainder of the address word is employed to deflect the raster of the vidicon to a position such that a desired one of the sixteen characters may be read out.

*Ambiguous character selection*

In some cases, in the languages dealt with here, a given group of strokes arranged in the same sequence can refer to two, three, or four different characters. This is because the strokes, even though substantially the same, are placed in slightly different positions on the page. Page 478 on the Sinotype article above gives a number of examples, including GBBD, which can refer to two different characters; BDB, which can refer to three different characters; and so on. The present machine includes means for distinguishing these characters from one another.

As in the case of any other character, the codes which represent the ambiguous characters are stored on different lines of the drum memory. However, a "1" is recorded along the 103rd or ambiguous character track next to the first occurring such character in a group of ambiguous characters. Also, in the optical matrix 60, any pair, triad, or tetrad of ambiguous characters is always placed within the area of the four central characters of a sixteen-character cell. In FIGURE 6, this area is outlined by a dashed line.

The ideographs BDB #1, BDB #2, and BDB #3 appear in the first three of these areas, respectively, hereafter known as areas 2*b*, 3*b* and 2*c*, respectively, where the numerals refer to the columns and the letters refer to the rows. In the case of a triad, such as shown, the fourth area, namely 3*c*, may be blank. It is sometimes advantageous to do this to avoid confusing the operator when the four areas are displayed concurrently, as discussed shortly. On the other hand, if space is at a premium, the area or areas not employed for ambiguous character storage, such as area 3*c* in the illustration, may be employed to store any other character, as in the example shown.

In operation, when the keyboard produces the code of an ambiguous character, there is a match between the word stored in the shift register circuits and the first recorded ambiguous character in the drum memory (in the present example, BDB #1). The coincidence detector 40 (FIGURE 1) thereupon produces a "1" at output 44. This "1" serves as a priming signal for AND gate 277. A "1" is also read from the 103rd or ambiguous character track of the drum memory. This "1" is applied through the read amplifier 251 and lead 45 as a second or enabling input to AND gate 277. Accordingly, AND gate 277 produces a "1" output on lead 257.

When the coincidence detector 40 produces a "1" output, as just mentioned, gate 42 also becomes enabled and the count on the counter 46 passes through the gate to the storage register circuits 52. As indicated in the previous discussion, this count is the address in the storage matrix of a group of sixteen characters (which, in the present case, includes the ambiguous characters located in two, three or four of the central four areas of the sixteen-character cell). The second part of the address is normally the address of one character in the group of sixteen, and it is normally applied to the vidicon deflection digital-to-analog converter 56. In the present instance, the latter step does not occur. Instead, the one appearing on lead 257 essentially converts the output supplied by the storage register circuit 52 to a standard address, such as 0000,0000 which causes the vidicon sweep to start at the upper left corner of the character in row $b$, column 2 (the upper left corner of the area outlined by the dashed lines in FIGURE 6). This is discussed in somewhat more detail shortly in connection with FIGURE 8.

At the same time that the above is occurring, the storage register circuits 52 produce an output which is applied by the lead 259 directly to the horizontal and vertical deflection circuits 72. This output is a voltage level which is applied to the variable gain amplifier of the deflection circuits for the vidicon and which causes the scan raster to expand in the horizontal and vertical directions until the middle four characters in the cell (rather than a single character in the cell) are positioned beneath the expanded scan raster.

Summarizing the above, when an ambiguous character is stroked, the coincidence detector 40 produces an output. Also, an output is obtained from the 103rd or ambiguous character track. These combined outputs cause the coarse selection by the lamp selector decoder 54 and the lamp bank 58 of a cell of sixteen characters which contain at the center portion of the cell two, three or four ambiguous characters. The vidicon receives an address from the storage register such that its raster starts at the upper left corner of this group of four characters. In addition, the deflection circuits 72 receive a voltage level from the circuits 52 which causes the raster to expand to the size of four characters.

The four characters scanned out by the vidicon appear on the display kinescope 82 and are visible to the operator. He therefore then selects the one character in the group displayed which he desires to be photographed. For this purpose, there are four keys on the keyboard, designated #1, #2, #3 and #4. Each key corresponds to a different one of the four areas displayed on the display kinescope screen. The operator selects the desired ambiguous character of the four which appear on the display kinescope by depressing one of these keys. This may cause a signal to appear on the ambiguous character selection lead 261 of FIGURE 1 and also causes certain signals to be applied to the shift register circuits 28, as discussed shortly. The result of the depression of such a key is to cause the deflection circuits 72 to return to their usual mode of operation in which the raster size is reduced to that of only one character rather than four, and the bias circuits to provide a bias such that the raster is positioned over the desired one of the four central characters. When this occurs, the photograph key may be depressed.

Figure 8:
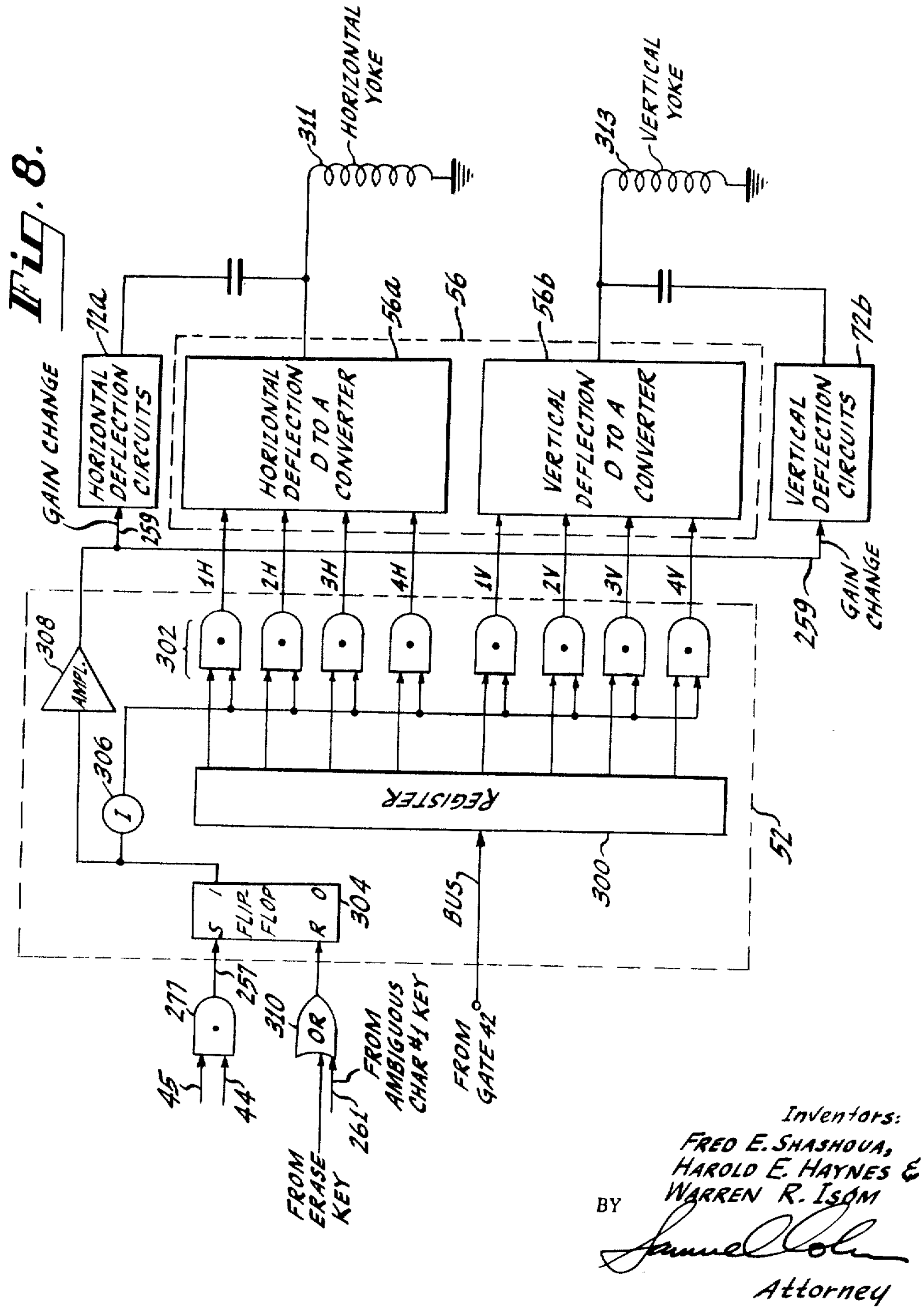
FIGURE 8 is a block circuit diagram of certain of the ambiguous character selection circuits of FIGURE 1.

The circuits above are shown in more detail in FIGURE 8. The storage register circuits of block 52 are shown within the dashed line 52 of FIGURE 8. These circuits include the register 300 and eight output AND gates 302. There is also a flip-flop 304 within block 52 which is normally reset. The inverter 306 therefore normally provides a priming signal to the AND gates 302. The amplifier 308, which is also connected to the 1 output of the flip-flop, can be considered normally to be inactive and not to affect the vidicon deflection digital-to-analog converter 56 or the deflection circuits 72a and 72b (block 72 of FIGURE 1).

The AND gate 277 of FIGURE 1 is shown at the upper left of FIGURE 8. Its output lead 257 is connected to the set (S) terminal of flip-flop 304. It might be mentioned, in passing, that there may be other inputs to this AND gate which normally prime the AND gate; however, to simplify the discussion, these are omitted. The same holds for OR gate 310 which is connected to the reset (R) terminal of the flip-flop 304. Only the inputs from the erase key and the #1 ambiguous pulse key are shown.

In the operation of the circuit of FIGURE 8, when an ambiguous character is stroked out, bits indicative of the address of the ambiguous characters pass from gate 42 to register 300. At the same time, the bits "1" appear on leads 45 and 44, lead 45 carrying the bit from the ambiguous character track, and flip-flop 304 becomes set. The "1" appearing at the 1 output lead is changed to a "0" by inverter 306 and AND gates 302 are all disabled. Accordingly, the addresses applied to the horizontal deflection digital-to-analog converter 56a and the vertical deflection digital-to-analog converter 56b are 0000 and 0000, respectively. As a result of these inputs, the converters 56a and 56b apply direct current biases to the horizontal and vertical deflection yokes 311 and 313, respectively, of the vidicon 70 such that the raster starts at the upper left corner of area 2b in FIGURE 6.

The amplifier 308 also now applies a voltage to the horizontal and vertical deflection circuits 72a and 72b such that the gain of these circuits is changed. The raster size which results is sufficient to cover the four central characters of FIGURE 6. In other words, both the horizontal and vertical deflection signal amplitudes are increased to double their previous values. The result then of setting the flip-flop 304 is to cause the vidicon 70 (FIGURE 1) to scan the four central characters in the cell selected. These four characters thereupon are displayed on the display kinescope 82 of FIGURE 1. In FIGURE 6, the characters BDB #1, BDB #2 and BDB #3 are among the four which are displayed.

After the four characters are displayed, it is necessary for the keyboard operator to select one of the characters. In the present example, there are three ambiguous characters. If the operator wishes to select the first one of these characters, that is, BDB #1, he depresses ambiguous character #1 selection key. The depression of key #1 causes the routing switch 22 (FIGURE 1) to apply an advance signal to the shift register circuits 28. This causes the existing code in the shift register 28 to shift five bits to the right. However, the depression of the ambiguous character #1 key on the keyboard does not add another character to the shift register 28.

When the code stored in the shift register is moved to the right, as indicated, there is no longer any coincidence between the code stored in the shift register and a code stored in the drum memory. Therefore, a coincidence pulse does not appear on lead 44. Therefore, AND gate 277 (FIGURES 1 and 8) becomes disabled.

At the same time, the depression of the ambiguous character #1 key causes a pulse to be applied via lead 261 through OR gate 310 of FIGURE 8 to the reset terminal of flip-flop 304. This causes the flip-flop to become reset and a priming signal to be applied to the AND gates 302 through the inverter 306.

At the same time, the gain change signal is no longer applied by amplifier 308, and the horizontal and vertical deflection circuits 72a and 72b now cause a raster to be produced which is of normal size, that is, which covers only one character.

As the system does not generate a new coincidence pulse, when the ambiguous character #1 key is depressed, the register 300 continues to store the same code as it did prior to the depression of this key. This code is the address of the first ambiguous character, BDB #1 in the present example. Accordingly, the vidicon 70 of FIGURE 1 scans out the first ambiguous character BDB #1, and it is displayed on the display kinescope 82 of FIGURE 1.

The operator may desire to select the second, third or fourth ambiguous character, rather than the first. In the event that he does depress one of these other keys, the routing switch of FIGURE 1 applies another five-bit code to the shift register circuits and causes the code already stored there to be shifted five places to the right. The coincidence detector thereupon produces an output indicative of a match between the new code stored in the shift register circuits and a code stored in the drum memory. For example, in the event that the key depressed is the ambiguous character #2 key, the coincidence detector produces an output at lead 44 at that time such that the count on counter 46 is indicative of the address of the second ambiguous character, namely BDB #2 in the example of FIGURE 6. In response to this address, the system operates in the usual manner in that the vidicon scans out the second ambiguous character and the display kinescope 82 displays it for examination by the operator.

*Over-riding a shorter character with a longer character*

It sometimes occurs that during the stroking sequence required for typing a relatively long character (one with many strokes), a shorter character (one having fewer strokes) is stroked. In the present machine, this shorter character is recognized immediately in the manner already described and is displayed on the kinescope. The operator does not depress the photograph key, since it is not the character he desires to print; instead, he continues typing in search of the desired character. As soon as he has typed the required number of strokes, a new coincidence signal will be produced by the detector 40 and the gate 42 will cause a new count to be transferred from the counter 46 to the storage register 52. (Since no coincidence pulse occurs at 44 until a new (the longer) character is recognized, the shorter character remains displayed until the new coincidence pulse appears.) This new count transferred in to the storage register causes the longer character to be displayed on the kinescope, whereupon the operator can depress the photograph key and cause the longer character to be photographed. Reset of the storage register in stage 52 may be automatic, in response to the coincidence signal in lead 44, for example, and may occur immediately prior to the transfer of the count from 46 through the gate 42 to the register 52.

*Minimum spelling circuits*

As mentioned in the previous paragraph, some longer characters in the languages here under consideration include within them a shorter character. In other words, some of the codes stored in the drum memory represent minimum ideograph spellings and others do not. In the present system, next to those lines which indicate minimum spellings, there is a "1" recorded in the $104^{th}$ or minimum spelling track.

In operation, when there is a match between a word stored in the shift register and a word stored in the drum memory, the coincidence detector 40 produces a "1" on its output lead 44. If this word represents a minimum spelling, a "1" is read from the $104^{th}$ track of the drum memory. This "1" is applied through read amplifier 281 to one of the inputs to AND gate 279 (lower left of FIGURE 1). A second input to this AND gate is the "1" output of the coincidence detector 40. Accordingly, AND gate 279 becomes enabled and produces a "1" which is fed back through lead 283 to the locking mechanism within the keyboard 10. The latter, for example, may be solenoid actuated. The locking mechanism locks the keyboard and prevents the operator from typing further until he has depressed either the photograph key or the erase key.

*Operation decoder*

Figure 7:
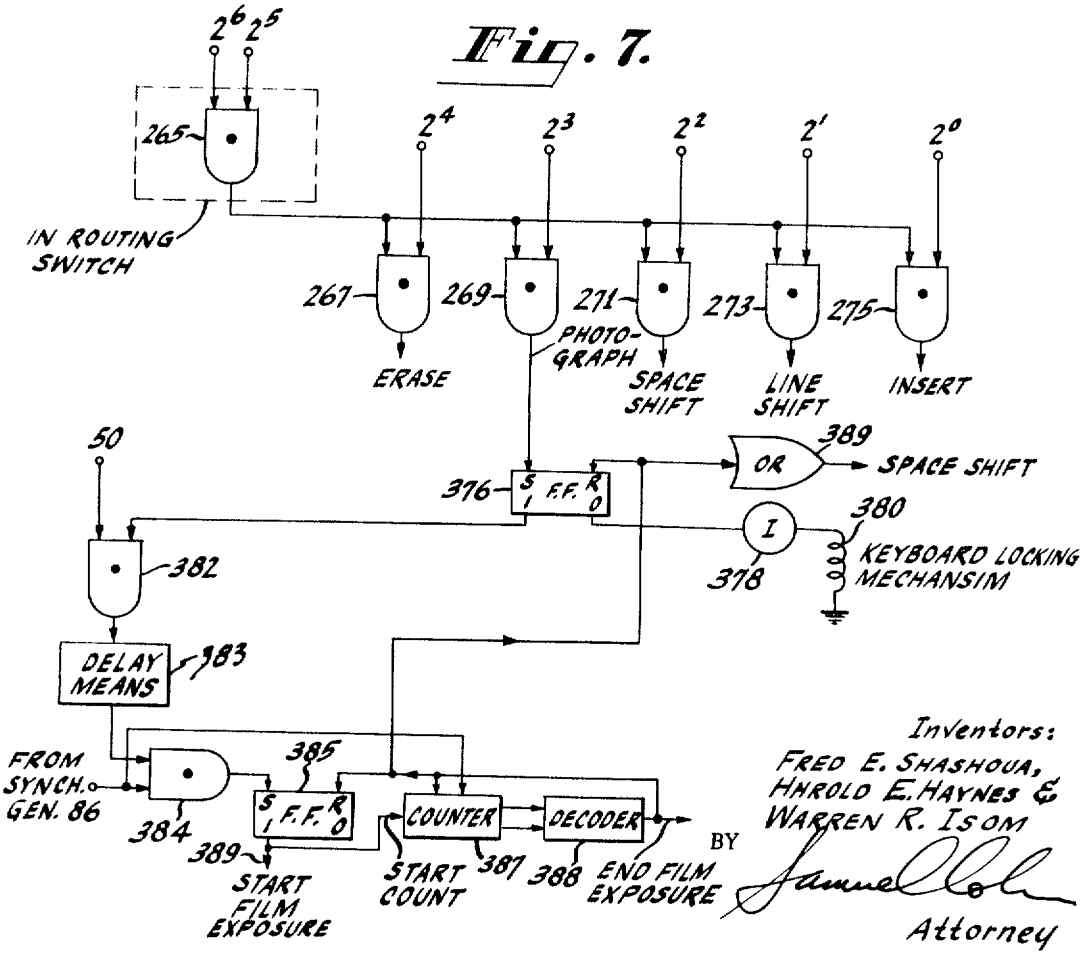
FIGURE 7 is a block circuit diagram of a portion of the operation decoder and associated circuits of FIGURE 1.

The operation decoder 30 of FIGURE 1 and some of the circuits associated with it, by way of example, are shown in FIGURE 7. The decoder includes a first AND gate 265, which is connected to receive the $2^6$ and $2^5$ bits. As in previous cases, there may be a temporary storage register between the keyboard and gate 265 for temporarily storing these bits. The decoder also includes additional AND gates 267, 269, 271, 273 and 275, each connected to receive one of the remaining five bits from, for example, the register 121 of FIGURE 2. The output of AND gate 265 serves as a priming signal for the remaining five AND gates.

In the operation of the decoder above, whenever a key is depressed which represents an operation, the $2^6$ and $2^5$ bits are each 1 and AND gate 265 produces a 1 output. The remaining AND gates decode the five other inputs. For example, when the photograph key is depressed, the code 01000 is applied to the group of five AND gates. AND gate 269 therefore receives a 1 as the $2^3$ bit and a 1 as a priming signal from AND gate 265, and it produces a 1 output. This 1 output activates the photograph circuits shown in FIGURE 7 and discussed below. The remaining four AND gates 267, 271, 273 and 275 are inactive as each receive a 0 as one of their inputs.

The photograph circuits of FIGURE 7 include a flip-flop 376, the set terminal of which is connected to the photograph AND gate 269. The 0 output of the flip-flop is connected through an inverter 378 to the keyboard locking mechanism illustrated schematically as coil 380. The 1 output of the flip-flop is connected to AND gate 382. The second input to the AND gate 382 is the pulse from the index track of the drum. This input is supplied by lead 50 at the output of read amplifier 251 of FIGURE 1.

The output of AND gate 382 is delayed by delay means 383 and applied as one input to the AND gate 384. The second input to AND gate 384 is a vertical or frame synchronizing pulse from the synchronization generator 86. The output of AND gate 384 is applied to the set terminal of flip-flop 385.

The 1 output terminal of flip-flop 385 is connected to a counter 387, the output of which is decoded by a decoder 388. The decoder output is applied to the reset terminals of counter 387 and flip-flops 385 and 376, and to OR gate 389.

In the operation of the arrangement just described, when the photograph signal is produced, flip-flop 376 becomes set. Thereupon, the signal produced by inverter 378 locks the keyboard, preventing the operator from proceeding further until the ideograph on the exposure kinescope has been photographed. The 1 output of flip-flop 376 primes AND gate 382. The next index pulse from the drum enables AND gate 382.

The delay means 383 provides approximately $\frac{3}{10}$ of a second's delay to allow the video signals produced by the vidicon to "settle down" before film exposure. In practice, the delay means may be a counter and a decoder which is connected to be actuated when a count is reached indicative of $\frac{3}{10}$ of a second. Alternatively, a mechanical or electrical delay device may be employed.

The delayed output of AND gate 382 enables the AND gate 384 in synchronism with the first vertical or frame synchronization pulse which occurs after the delayed AND gate signal has been applied. The enabled AND gate 384 sets the flip-flop 385. When the flip-flop is set, the signal appearing on lead 389 causes the exposure to start. This signal may be applied, for example, to "open the shutter" of the camera, in the manner already discussed. In other words, the signal causes the cathode of the exposure kinescope to be driven negative, and an image to appear on its screen which the lens turret projects onto the film.

When the film exposure starts, the counter 387 starts counting the synchronization pulses. Upon reception of the third such pulse (two periods of vertical synchronization), the decoder 388 produces an output which ends the film exposure by resetting flip-flop 385, thereby causing the shutter "to close" (and the exposure kinescope again to become biased below cut-off). This output also resets counter 387 and flip-flop 376. The output of the decoder 388 also actuates OR gate 389 which produces a space shift signal.

When flip-flop 376 is reset, the keyboard locking mechanism is de-energized. And, since the film transport mechanism has shifted the film one space in response to the "space shift" signal which is automatically generated by OR gate 389, the machine is again ready for new inputs.

What is claimed is:

1. In a system for composing ideographs from strokes, in combination,
- means for translating input stroke information into binary coded signals;
- means for accumulating said binary coded signals;
- a memory which stores a plurality of binary coded words, each indicative of an ideograph;
- an optical storage matrix of ideographs corresponding to the binary words stored in the memory;
- comparison means for comparing the binary words stored in the memory with the accumulated binary signals and, when a match is obtained, generating an address indicative of the location in said matrix of a desired ideograph identified by the accumulated binary coded signals;
- means responsive to said address for illuminating a group of ideographs, including the desired ideograph, in said matrix; and
- means responsive to said address for selecting the desired ideograph from the group of ideographs illuminated.

2. In a system for composing ideographs from strokes, in combination,
- means for translating input stroke information into binary coded signals;
- means for accumulating said binary coded signals;
- a memory which stores a plurality of binary coded words, each indicative of an ideograph;
- an optical storage matrix of ideographs corresponding to the binary words stored in the memory;
- comparison means for comparing the binary words stored in the memory with the accumulated binary signals and, when a match is obtained, generating an address indicative of the location in said matrix of a desired ideograph identified by the accumulated binary coded signals;
- means responsive to said address for illuminating a group of ideographs, including the desired ideograph, in said matrix; and
- means responsive to said address for scanning solely the desired ideograph in the group of ideographs illuminated to obtain an image of that ideograph.

3. In a system for composing ideographs from strokes, in combination,
- means for translating input stroke information into binary coded signals;
- means for accumulating said binary coded signals;
- an electronic memory which stores a plurality of binary coded words, each indicative of an ideograph;
- a fixed optical storage matrix of ideographs corresponding to the binary words stored in the memory;
- comparison means for comparing the binary words stored in the memory with the accumulated binary signals and, when a match is obtained, generating an address indicative of the location in said matrix of a desired ideograph identified by the accumulated binary coded signals;
- means responsive to one portion of said address for illuminating a group of ideographs, including the desired ideograph, in said matrix;
- means for projecting an image of the group of ideographs onto the image-receiving surface of an electron beam scanning device; and deflection means responsive to another portion of said address for deflecting a raster scan of said electron beam over solely that portion of said image-receiving surface containing the image of a desired ideograph.

4. In combination, an optical storage matrix for storing ideographs;

a keyboard, the keys of which are imprinted with strokes which, in various combinations, form ideographs;

means responsive to the actuation of a plurality of keys on the keyboard, which identify the strokes forming an ideograph, for selecting from the optical storage matrix said ideograph, and for making a record of said selected ideograph; and means responsive to an ideograph indication not available in the optical storage matrix for placing an indication thereof on the same record on which the ideograph selected from the storage matrix appears.

5. In combination, an optical storage matrix for storing ideographs;

a keyboard, the keys of which are imprinted with strokes which, in various combinations, form ideographs;

means responsive to the actuation of a plurality of keys on the keyboard, which identify the strokes forming an ideograph, for selecting from the optical storage matrix said ideograph and for projecting an image of said ideograph onto a record medium; and means responsive to the actuation of a key on said keyboard for sensing an ideograph indication appearing on a medium other than said optical storage matrix, and for projecting an image thereof on the same record medium on which the ideograph selected from the storage matrix is projected.

6. In combination, an optical storage matrix for storing ideographs;

a keyboard, the keys of which are imprinted with strokes which, in various combinations, form ideographs;

means responsive to the actuation of a plurality of keys on the keyboard, which identify the strokes forming a desired ideograph, for illuminating a group of ideographs, including the desired ideograph, in said optical storage matrix;

an electron beam image-receiving device responsive to said actuation of said plurality of keys, for scanning out said desired ideograph from the group of said ideographs illuminated;

a film;

a display device, responsive to said electron beam device for projecting an image of said desired ideograph onto said film; and a second electron beam image-receiving device, responsive to the actuation of a key on said keyboard, for scanning out an ideograph appearing on a medium other than the storage matrix, and applying the signals thereby obtained to said display device, whereby the latter projects an image of said last-named ideograph onto said film.

7. In a system for composing ideographs from strokes, in combination, means for translating input stroke information into binary coded signals;

a shift register for accumulating said binary coded signals;

a drum memory which stores on successive lines thereof binary coded words, each indicative of an ideograph, and which includes also a clock pulse track for generating a clock pulse for each line on the drum;

an optical storage matrix of ideographs corresponding to the binary words stored in the drum memory;

a counter coupled to the drum for counting the clock pulses generated thereby;

a comparator coupled to the shift register and to the drum memory for comparing the binary words stored in the latter with the accumulated binary signals stored in the shift register and, in response to an equality between a word stored in the drum and a code stored in the shift register, generating a signal which directs the counter to be read out;

means responsive to the count read out of said counter for illuminating a group of ideographs in said matrix, said group including the ideograph identified by the count read out of said counter;

an electron beam scanning device having an image-receiving surface;

means for projecting an image of said group of ideographs into the image-receiving surface of said electron beam scanning device; and deflection means responsive to the count read out of said counter for deflecting a raster scan of said electron beam over solely that portion of said image-receiving surface containing the image of the desired ideograph.

8. In a system for composing ideographs from strokes, in combination, means for translating input stroke information into binary coded signals;

a shift register for accumulating said binary coded signals;

a drum memory which stores on successive lines thereof binary coded words, each indicative of an ideograph, and which includes also a clock pulse track for generating a clock pulse for each line on the drum;

an optical storage matrix of ideographs corresponding to the binary words stored in the drum memory;

a counter coupled to the drum for counting the clock pulses generated thereby;

a storage register;

a comparator coupled to the shift register and to the drum memory for comparing the binary words stored in the latter with the accumulated binary signals stored in the shift register and, in response to an equality between a word stored in the drum and a code stored in the shift register, generating a signal for reading the count stored in the counter into said storage register;

means responsive to the count read out of said counter for illuminating a group of ideographs in said matrix, said group including the ideograph identified by the count read out of said counter;

an electron beam scanning device having an image-receiving surface;

means for projecting an image of said group of ideographs into the image-receiving surface of said electron beam scanning device;

deflection means responsive to the count read out of said counter for deflecting a raster scan of said electron beam over solely that portion of said image-receiving surface containing the image of the desired ideograph; and display means coupled to said electron beam for displaying said desired ideograph.

9. In combination, an optical storage matrix for storing ideographs;

a keyboard, the keys of which are imprinted with strokes which, in various combinations, form ideographs;

a display device;

means responsive to the actuation of a plurality of keys on the keyboard which identify the strokes forming an ideograph, for selecting from the optical storage matrix said ideograph, and producing an image of the selected ideograph on said display device; and means responsive to the actuation of a plurality of keys on the keyboard, which identify the strokes forming a plurality of ambiguous ideographs, for selecting from the optical storage matrix said plurality of ambiguous ideographs and concurrently displaying them on said display device.

10. In combination,
an optical storage matrix for storing ideographs;
a keyboard, the keys of which are imprinted with strokes which, in various combinations, form ideographs;
a display device;
an electron beam scanning device coupled to said display device for receiving an image from said optical storage matrix and applying an electrical output corresponding thereto to said display device;
means responsive to the actuation of a plurality of keys on the keyboard which identify the strokes forming an ideograph, for illuminating a group of ideographs on the storage matrix and causing the electron beam device to scan out a selected ideograph from the illuminated group of said ideographs; and
means responsive to the actuation of a plurality of keys on the keyboard, which identify the strokes forming a plurality of ambiguous ideographs for illuminating a groups of ideographs on the optical storage matrix and causing the electron beam device to enlarge the area it scans and to scan out concurrently said plurality of ambiguous ideographs from the groups of ideographs illuminated.

11. In a system for composing ideographs from strokes,
an optical storage matrix for storing ideographs in groups;
means responsive to a group of strokes which identify a single ideograph for illuminating one group of the ideographs in the matrix and for scanning out from the group of ideographs illuminated said single ideograph; and
means responsive to a plurality of strokes which identify a plurality of ambiguous ideographs for illuminating a group of ideographs in the storage matrix, said group including said plurality of ambiguous ideographs, and for concurrently scanning out from the group said plurality of ambiguous ideographs.

12. In combination,
an optical storage matrix for storing ideographs;
a keyboard, the keys of which are imprinted with strokes which, in various combinations, form ideographs;
means responsive to the actuation of a plurality of keys on the keyboard which identify the strokes of a plurality of ambiguous ideographs, for illuminating a group of ideographs, including the plurality of ambiguous ideographs, in said optical storage matrix; and
an electron beam image-receiving device responsive to said actuation of said plurality of keys, for concurrently scanning out said group of ambiguous ideographs from the group of all of the ideographs illuminated.

13. In combination,
an optical storage matrix for storing ideographs;
a keyboard, the keys of which are imprinted with strokes which, in various combinations, form ideographs;
means responsive to the actuation of a plurality of keys on the keyboard, which identify the strokes forming one or more desired ideographs, for illuminating a group of ideographs, including said one or more desired ideographs, in said optical storage matrix;
an electron beam image-receiving device; and
deflection circuits for said electron beam image-receiving device responsive to the actuation of a plurality of keys which identify a single ideograph, for causing the electron beam image device to generate a relatively small size raster for scanning out said single ideograph from a group of said ideographs illuminated, and responsive to the actuation of a plurality of keys which represent a plurality of ambiguous ideographs for causing the electron beam image-receiving device to produce a raster of expanded size for concurrently scanning out said plurality of ambiguous ideographs from the group of said ideographs illuminated.

14. In a system for composing ideographs from strokes,
an optical storage matrix for storing ideographs in groups;
means responsive to a group of strokes which identify a single ideograph for illuminating one group of the ideographs in the matrix and for scanning out from the group of ideographs illuminated said single ideograph;
means responsive to a plurality of strokes which identify a plurality of ambiguous ideographs for illuminating a group of ideographs in the storage matrix, said group containing said plurality of ambiguous ideographs, and for concurrently scanning out from the group said plurality of ambiguous ideographs; and
an electron beam display device connected to receive electrical signals indicative of the scanned-out image for displaying a single ideograph and, in the case of ambiguous ideographs, for concurrently displaying the plurality of ambiguous ideographs.

15. In combination,
an optical storage matrix for storing ideographs;
a keyboard, the keys of which are imprinted with strokes which, in various combinations, form ideographs;
a display device;
means responsive to the actuation of a plurality of keys on the keyboard which identify the strokes forming an ideograph, for selecting from the optical storage matrix said ideograph, and producing an image of the selected ideograph on said display device;
means responsive to the actuation of a plurality of keys in the keyboard, which identify the strokes forming a plurality of ambiguous ideographs, for selecting from the optical storage matrix said plurality of ambiguous ideographs and concurrently displaying them on said display device; and
means responsive to the actuation of an ambiguous character selection key on the keyboard, for selecting from the ambiguous characters displayed on the display device, a single one of said ideographs, and displaying solely that ideograph for display.

16. In a system for composing ideographs from strokes,
an optical storage matrix for storing ideographs in groups;
means responsive to a group of strokes which identify a single ideograph for illuminating one group of the ideographs in the matrix and for scanning out from the group of ideographs illuminated said single ideograph;
means responsive to a plurality of strokes which identify a plurality of ambiguous ideographs for illuminating a group of ideographs in the storage matrix, said group including said plurality of ambiguous ideographs, and for concurrently scanning out from the group said plurality of ambiguous ideographs;
means coupled to the means for scanning out ideographs for displaying the ideographs scanned out; and
selection means for selecting from a group of displayed ambiguous ideographs a single one to be scanned out and displayed.

17. In an ideograph machine,
a memory for storing bits indicative of ideographs and including in each ideograph storage location an indication of whether the ideograph stored there is common to another stored ideograph having a larger number of strokes, or is unique;

a register for storing bits indicative of strokes forming an ideograph;

a keyboard coupled to the register for applying bits indicative of strokes thereto for storage by the register;

a comparator for comparing the bits stored in the register with those stored in the memory and, when a match exists, producing an output;

means responsive to said output for producing an indication of whether or not the ideograph stored is unique; and means responsive to an indication that the ideograph stored is unique for locking the keyboard.

18. In an ideograph machine:

a storage matrix for storing ideographs, some of which have relatively few strokes which are common to and are written in the same sequence as the initial strokes of other ideographs in said matrix;

a keyboard, the keys of which are imprinted with strokes which, in various combinations, form ideographs;

means responsive to the actuation of a plurality of keys on the keyboard which identify the strokes of one of said ideographs which forms a part of another ideograph for automatically selecting said one ideograph from said storage matrix and displaying the same; and means responsive to the actuation of additional keys on the keyboard which identify strokes which, when added to the strokes defining said one ideograph define another ideograph in said storage matrix, for deleting from the last-named means the displayed ideograph and substituting therefore said other ideograph selected from said storage matrix.

References Cited

UNITED STATES PATENTS

| | | | |
|---|---|---|---|
| 2,679,035 | 5/1954 | Daniels et al. | 340—165 |
| 2,950,800 | 8/1960 | Caldwell | 197—1 |
| 3,124,784 | 3/1964 | Schaaf et al. | 340—173 |
| 3,274,550 | 9/1966 | Klein | 340—146.3 |

OTHER REFERENCES

Pages 477–502, "The Sinotype—A Machine for the Composition of Chinese from a Keyboard," by S. H. Caldwell, Journal of the Franklin Institute, vol. 267, No. 6.

ROBERT C. BAILEY, *Primary Examiner.*

O. E. TODD, *Assistant Examiner.*